Oct. 15, 1963  E. W. CAUFFMAN  3,107,005
ADJUSTABLE LIVESTOCK FEEDER
Filed May 18, 1962  2 Sheets-Sheet 1
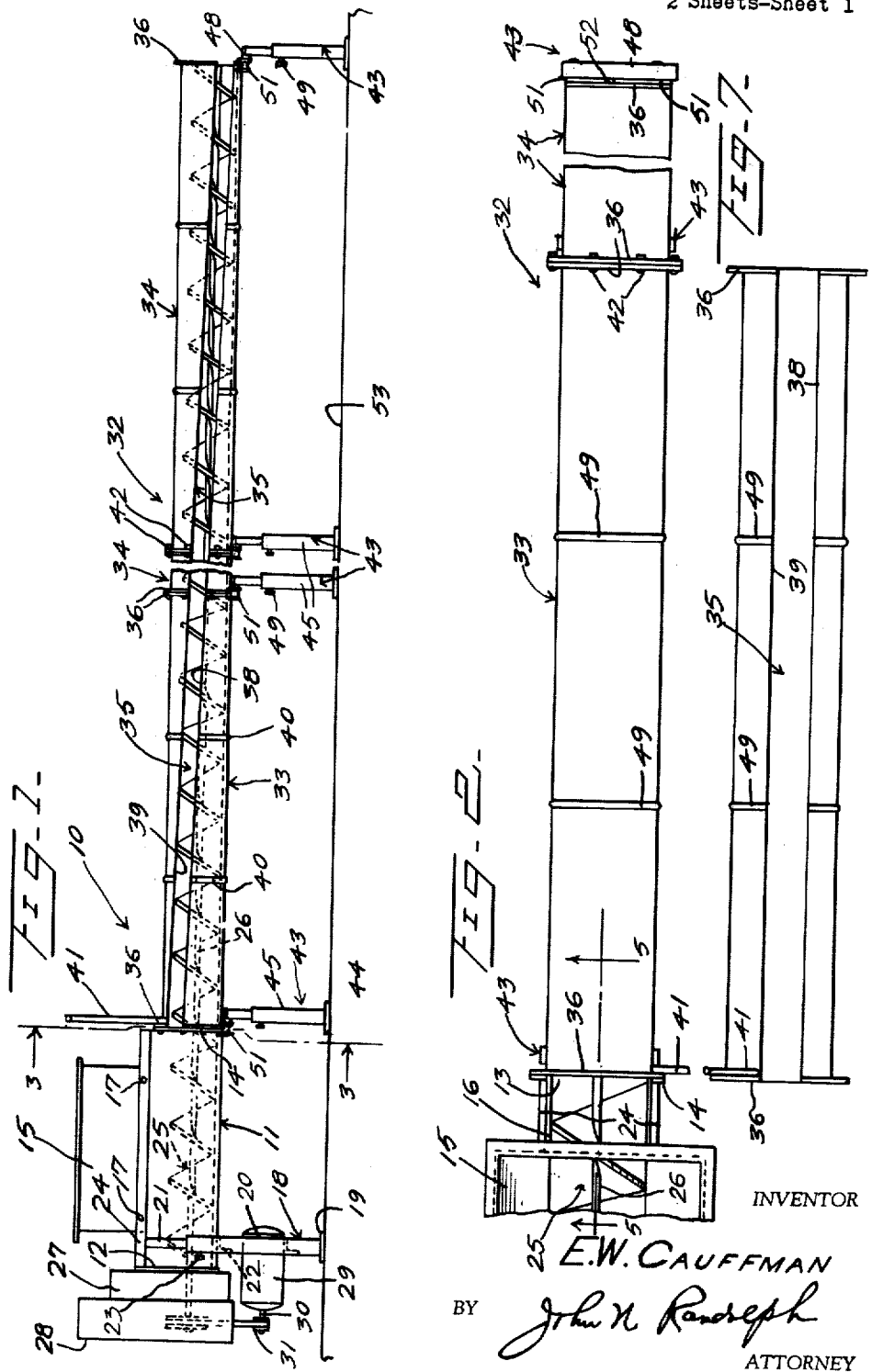
INVENTOR
E.W. CAUFFMAN
BY John N. Randolph
ATTORNEY

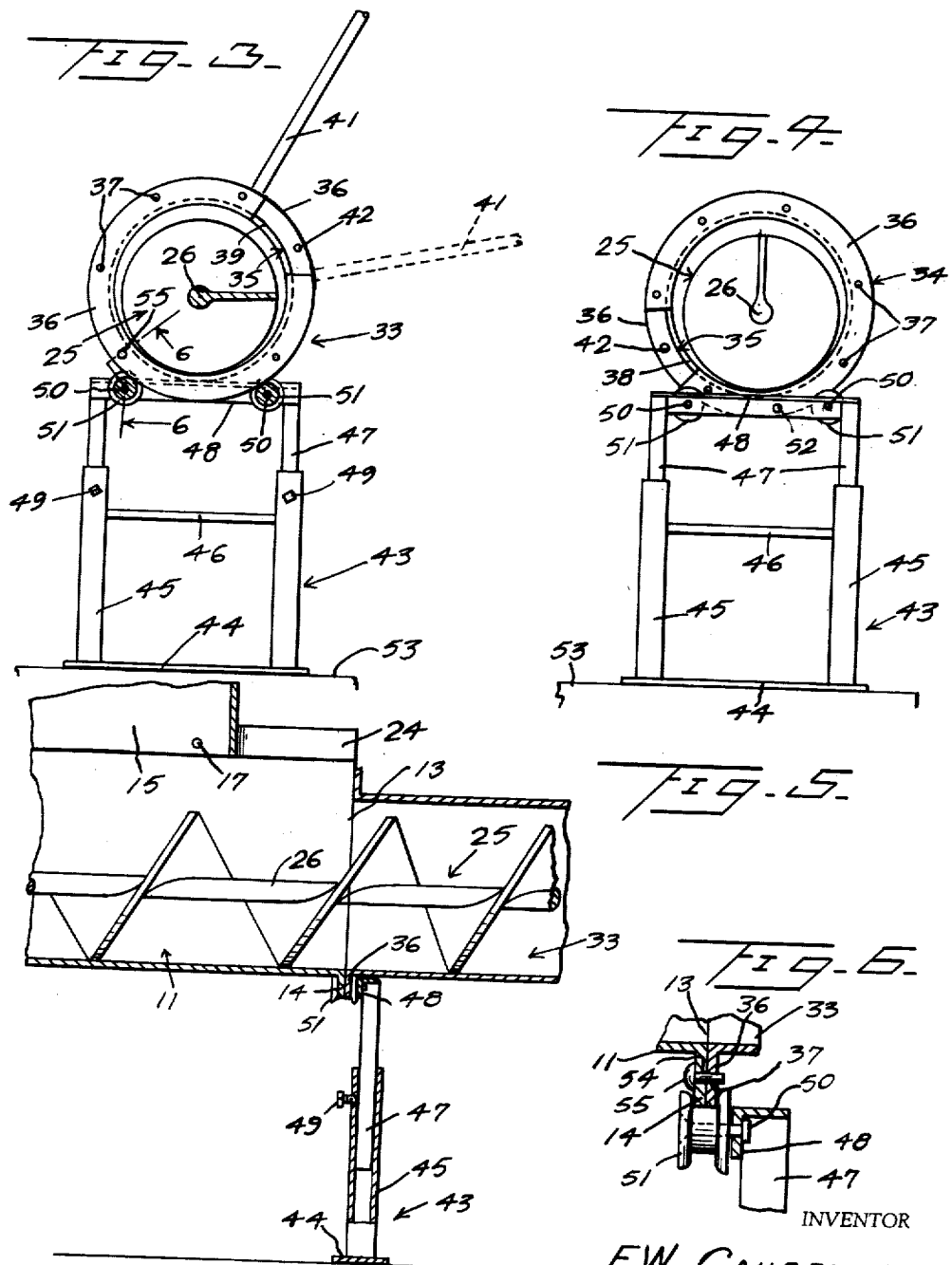

United States Patent Office 3,107,005
Patented Oct. 15, 1963

3,107,005
ADJUSTABLE LIVESTOCK FEEDER
Eugene W. Cauffman, Claypool, Ind., assignor to Parker Feeders, Inc., Silver Lake, Ind., a corporation of Indiana
Filed May 18, 1962, Ser. No. 195,734
4 Claims. (Cl. 198—213)

This invention relates to an improved feeder for livestock and more particularly to a conduit of considerable length, through which the feed is conveyed by an auger, including means for adjusting a part of the conduit whereby feed will be dispensed substantially uniformly from end-to-end thereof.

Another object of the invention is to provide a feeder capable of handling a variety of forages as well as grain and other similar finely divided feed material, and wherein adjustment of the feeder dispensing means may be varied, depending upon the type of feed being conveyed and dispensed, for substantially uniformly dispensing the material throughout the length of the feeder.

Still another object of the invention is to provide a feeder which may be made in various lengths and the dispensing means of which may be varied, depending upon the length of the feeder, to insure uniform distribution of the feed.

Various other objects and advantages of the invention will hereinafter become more fully apparent from the following description of the drawings, illustrating a presently preferred embodiment thereof, and wherein:

FIGURE 1 is a fragmentary side elevational view showing the feeder adjusted for equalizing the distribution of the dispensed feed throughout the length thereof;

FIGURE 2 is a fragmentary top plan view, on an enlarged scale, showing the feeder as it will appear when not in use;

FIGURE 3 is an enlarged cross sectional view taken substantially along the line 3—3 of FIGURE 1;

FIGURE 4 is an end elevational view, on an enlarged scale, looking at the right hand end of the feeder as seen in FIGURE 1;

FIGURE 5 is an enlarged fragmentary longitudinal sectional view taken substantially along a plane as indicated by the line 5—5 of FIGURE 2;

FIGURE 6 is an enlarged fragmentary sectional view through a part of the feeder, taken substantially along the line 6—6 of FIGURE 3, and FIGURE 7 is a side elevational view of a part of the feeder.

Referring more specifically to the drawings, the adjustable livestock feeder or conveyor and dispenser in its entirety is designated generally 10 and includes a trough 11 having an end wall 12 at one end thereof which closes said trough end and an open opposite end 13, as seen in FIGURE 2, which is provided with an outwardly projecting surrounding flange 14. A hopper 15 is mounted on and rises from a part of the open top 16 of the trough 11 and may be secured thereto by suitable fastenings 17.

The trough 11 is supported in part by a stand 18 which includes a base 19, a pair of tubular uprights 20 which are fixed to and rise from said base, extensible posts 21 which telescopically engage in and project upwardly from the uprights 20, and cross braces 22 which extend between and are secured to the uprights 20. Setscrews 23 extend radially into the uprights 20 for securing the posts 21 in different extended positions. The posts 21 engage under side flanges 24 of the trough 11 for supporting the trough near its end 12.

A part of an auger 25 extends longitudinally through the trough 11, said auger including a shaft 26 having an end projecting through the end wall 19. The shaft 26 extends through and is journaled in a bearing member 27 which is secured to the outer side of the end wall 12. The terminal portion of the shaft 26 extends into a downwardly opening housing 28 which is mounted on an outer side of the bearing 27. An electric motor 29 is mounted rigidly on a lower one of the cross braces 22 and is thus supported by the stand 18. The armature shaft 30 of the motor 29 is connected by a belt and pulley drive 31 to the end of the auger shaft 26 which terminates in the housing 28.

A tube, designated generally 32, is composed of a single section 33 and one or more sections 34. The tube sections 33 and 34 are each of generally cylindrical form in cross section and are each provided with a slot 35 which extends from end-to-end thereof. Each section 33 and 34 has end flanges 36 which project outwardly from the ends thereof and which have outer edges disposed concentric to the sections thereof. The flanges 36 have ends which terminate at the slots 35 of the sections so that said slots open through the flanges, as clearly illustrated in FIGURES 1 and 7. Each flange 36 is provided with a plurality of circumferentially spaced openings 37, as best seen in FIGURES 3 and 4. The slots 35 have substantially parallel bottom and top edges 38 and 39, respectively. Each tube section is preferably reinforced by longitudinally spaced external embossments 40 which extend circumferentially therearound between the edges 38 and 39. The tube section 33 differs from the tube section 34 only in that it is provided adjacent one end thereof with a lever 41 which is fixed to and projects outwardly therefrom. Fastenings 42, which engage through the openings 37 of abutting flanges of the tube sections, detachably secure said sections 33 and 34 to one another with the slots 35 of the different sections in registration with one another.

The tube 32 is supported by a plurality of stands 43 and each of which includes a base 44 having a pair of tubular uprights 45 fixed to and rising therefrom and which are connected by a cross brace 46. Rigid rods or posts 47 telescopically engage in and extend upwardly from the tubular uprights 45 and are connected at their upper ends by a cross brace 48. Setscrews 49 are threaded radially into the tubular uprights 45 for securing the posts 47 in different adjusted positions in the tubes 45 for supporting the cross member 48 at a desired elevation relative to the base 44.

Each stand 43 includes a pair of axles 50 which extend through the upper cross member 48 for supporting and journaling a pair of flanged rollers 51. The axles 50 provide horizontally disposed journals for the rollers 51 which are located on the same side of and adjacent the ends of the cross member 48.

The bases 44 rest on the same supporting surface 53 as the base 19 and the stands 43 are disposed in alignment with one another and with the stand 18 and are positioned crosswise of the tube 32. The stands 43 are positioned so that the flanges 36 engage in the rollers 51 thereof. The stand 43 which is located adjacent the trough 11 receives the flange 36 of the tube section 33 which constitutes the inlet end of the tube 32 and the rollers of said stand additionally receive the flange 14 of the trough 11, so that said stand 43 cooperates with the stand 18 to support the trough. As seen in FIGURES 5 and 6, said end flange 36 and the flange 14 are held in abutting engagement with one another by the rollers 51 which are engaged by said flanges and which are of a width, between the flange ends of said rollers, to snugly receive the flanges 36 and 14. The other end stand 43, located remote from the trough 11, receives the single end flange 36 of the tube section 34, located remote from the tube section 33, and which constitutes the other end of the tube 32, and a fastening 52, as seen in FIGURE 4, extends through the cross member 48 of said last mentioned stand 43 and through one of the openings 37 of the flange 36, which engages the rollers 51 of said stand, for securing said end of the tube 32 immovably to said stand 43.

The rollers 51 of each of the intermediate stands 43 engage flanges 36 of two adjacent tube sections which are connected by fastenings 42. It will thus be seen that the tube 32 is supported to oscillate relative to each of the stands 43 except the end stand located remote from the trough 11. The auger 25 is of a length to extend from end-to-end through the tube 32.

The fastening 52 secures the tube 32 to the stand 43, located remote from the trough 11, so that the bottom edge 38 of the slot 35 is located just above said outer end stand, as seen in FIGURE 4.

The tube sections 33 and 34 are formed of a material enabling the tube 32 to be twisted by a torque applied to the lever 41. When such a torque is applied the tube 32 will rotate relative to each of the stands 43 except the outer end stand to which it is immovably secured by the fastening 52. The torque is applied to the lever 41 in a direction for causing the slot 35 to slope upwardly from the outer to the inner end of the tube 32, as seen in FIGURE 1. The end flange 36 of the tube section 33 which abuts the flange 14 swivels relative thereto as the tube 32 is twisted, and one of the openings 37 of said end flange is brought into alignment with an opening 54 of the flange 14. A pin 55 is applied to and engages detachably through the opening 54 and said opening 37, as seen in FIGURE 6, to retain the tube 32 in its distorted or twisted position as illustrated in FIGURE 1 and which constitutes an operative position of the conveying and dispensing tube 32.

Various forages, grains or other feed, not shown, may be discharged into the trough 11 through the hopper 15 and will be conveyed from left to right, as seen in FIGURE 1, from said trough 11 longitudinally through the tube 32 by the auger 25 which is driven in a direction for conveying from left to right of FIGURE 1. Since the bottom edge 38 of the slot 35 slopes downwardly from the inlet end of the tube 32, which is connected to the trough 11, to its opposite end, the material being conveyed lengthwise through the tube 32 from the trough 11 will have to rise to a greater height to be discharged over the edge 38, near the trough 11, than remote from said trough. Thus, the tube 32 can be twisted by manipulation of the lever 41 so that the slot 35 will slope downwardly at a proper angle from the trough 11 in order that a substantially uniform discharge of the material, being conveyed through the tube 32 by the auger 25, will occur from end-to-end of the tube 32. In order to accomplish this, the amount that the tube 32 is twisted can be varied depending upon the length of the tube and the character of the material being conveyed therethrough and dispensed therefrom, and the flange 14 may be provided with a series of spaced openings 54, any one of which may align with an opening 37 to receive the pin 55. When the feeder 10 is not in use, the lever 41 will be swung downwardly so that the slot 35 will be disposed at the same level from end-to-end of the tube, as seen in FIGURE 2, in which position the slot is located in the lower half of the tube so that rain or other moisture will not enter the tube through said slot. It will also be apparent that the stands 43 and the stand 18 may be individually adjusted vertically so that the tube 32 may slope downwardly from its inlet to its outer end, if desired.

Various modifications and changes are contemplated and may be resorted to, without departing from the function or scope of the invention as hereinafter defined by the appended claims.

I claim as my invention:

1. An adjustable livestock feeder comprising an elongated tube having a slot extending from end-to-end thereof and including an inlet end and an opposite end, a driven auger disposed in and extending from end-to-end through said tube for rotation in a direction for feeding through said tube toward said opposite end, a plurality of stands disposed beneath and supporting said tube at longitudinally spaced points, means rigidly connecting said opposite end of the tube to one of said stands, each of the other stands having means rotatively supporting the tube, and means for imparting torque to the tube adjacent its inlet end for twisting the tube for positioning the slot at a selected angle of incline downwardly from the inlet end to the opposite end of the tube.

2. An adjustable conveyor and dispenser comprising an elongated tube having an inlet end and an opposite end and provided with a slot extending from end-to-end thereof, a driven auger extending longitudinally through the tube and rotating in a direction for conveying material from the inlet end to said opposite end, a plurality of longitudinally spaced stands supporting said tube, means immovably securing one end of the tube to one of said stands, each of said other stands having means rotatively supporting the tube, and means connected to the tube, remote from said first mentioned stand, for imparting torque to the tube for causing the tube to turn relative to the other stands and be twisted to position said slot at a selected angle of incline downwardly from said inlet end to the opposite end whereby material being conveyed through the tube by the auger will be discharged from said slot substantially uniformly from end-to-end of the tube.

3. An adjustable conveyor and dispenser comprising an elongated tube having a longitudinally extending slot, a driven auger operating in said tube for conveying material longitudinally in one direction through the tube, means immovably supporting one end of said tube, and means for imparting torque to the tube near the other end thereof for twisting the tube to cause the slot to assume a selected volute form.

4. An adjustable conveyor and dispenser comprising an elongated tube having a longitudinally extending slot, a driven auger disposed in said tube for conveying material in one direction longitudinally through the tube, means immovably supporting the end of the tube toward which the material is conveyed, means rotatively supporting the tube adjacent the other end thereof, and means for imparting torque to the tube near said last mentioned end for twisting the tube to cause the slot to assume a selected volute form inclined downwardly toward the first mentioned tube end.

References Cited in the file of this patent

UNITED STATES PATENTS

| | | |
|---|---|---|
| 2,630,906 | Philipp | Mar. 10, 1953 |
| 2,867,314 | Hansen | Jan. 6, 1959 |
| 3,037,611 | Majorowicz | June 5, 1962 |

Notice of Adverse Decision in Interference

In Interference No. 94,298 involving Patent No. 3,107,005, E. W. Cauffman, ADJUSTABLE LIVESTOCK FEEDER, final judgment adverse to the patentee was rendered Mar. 18, 1965, as to claims 1, 2, 3 and 4.

[*Official Gazette May 4, 1965.*]